T. S. Disston — Improved Saw Gumming Machine.
No. 73239
PATENTED
JAN 14 1868
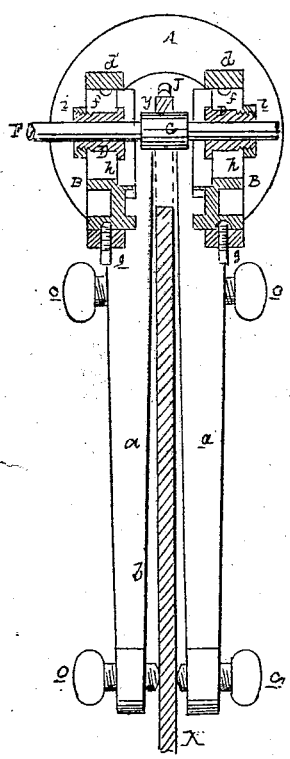
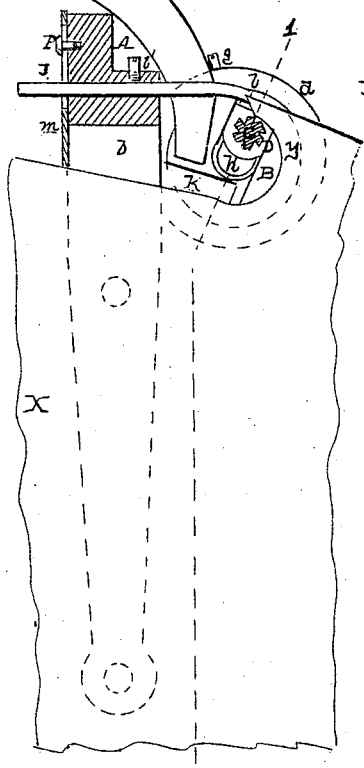
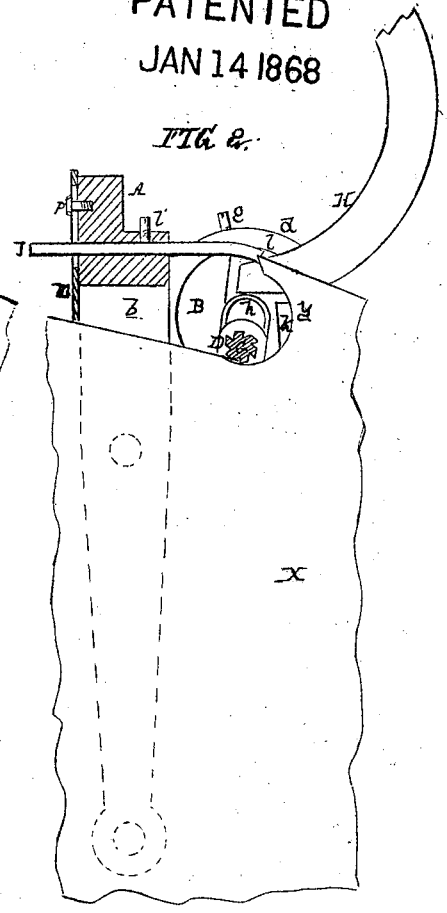
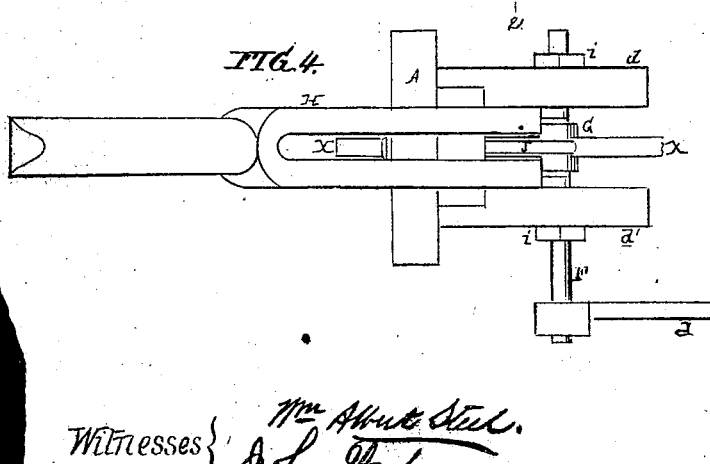
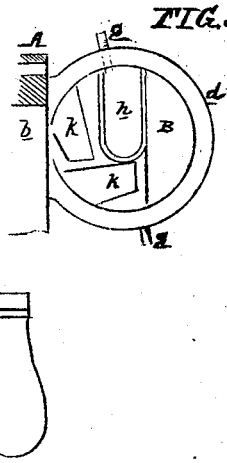
Witnesses: Wm Abbott Steel, John Parker

United States Patent Office.

THOMAS S. DISSTON, OF PHILADELPHIA, PENNSYLVANIA, ASSIGNOR TO HENRY DISSTON, OF SAME PLACE.

Letters Patent No. 73,239, dated January 14, 1868.

IMPROVEMENT IN SAW-GUMMING MACHINE.

*The Schedule referred to in these Letters Patent and making part of the same.*

TO ALL WHOM IT MAY CONCERN:

Be it known that I, THOMAS S. DISSTON, of Philadelphia, Pennsylvania, have invented an Improved Saw-Gumming Machine; and I do hereby declare the following to be a full, clear, and exact description of the same.

My invention consists of certain adjustable mechanism, fully described hereafter, for cutting the fronts of saw-teeth of any size.

In order to enable others familiar with machinery of this class to make and use my invention, I will now proceed to describe its construction and operation, reference being had to the accompanying drawing, which forms a part of this specification, and in which—

Figure 1 is a sectional elevation of my improved saw-gumming machine.

Figure 2 the same, with the operating parts in a different position.

Figure 3 is a transverse vertical section on the line 1-2, fig. 1.

Figure 4 a plan view, and

Figure 5 a detached sectional view of a portion of the frame of the machine.

Similar letters refer to similar parts throughout the several views.

From the frame A of the machine project two long arms, $a$ and $a'$, between which is a narrow opening, $b$, extending upwards into the frame, and in each of the said arms are set-screws $c\ c$. Turning in annular projections $d\ d'$ on and forming a part of the frame A, are two disks, B and B', which are retained in their places by set-screws $g$, which enter the grooves $f$ of the disks, (see figs. 3 and 5.) In each of the disks B and B' is formed an opening or guide, $h$, in which is arranged to slide a block, D, and each of the latter may be secured in any position in the said guides by a nut, $i$. A spindle, F, passing through and turning in the blocks D, is provided with a crank-handle, $j$, and cutter-wheel, G. On the inner face of each of the disks B and B', are recesses $k$ and $k'$, to which are adapted the forked ends of an arm, H, the two disks being turned simultaneously when the said arm is operated, in the manner described hereafter. A rod, J, having a notched end, $l$, passes through the frame A, and is secured to the same in any desired position, by a set-screw, $l'$; and a slotted plate, $m$, through which the rod J passes, is secured to the rear of the frame A by a set-screw, $p$, (see figs. 1 and 2.) The arms $a$ and $a'$ of the machine are passed over the circular-saw blade X, the centre of the semicircular front of the tooth $y$ to be sharpened is then accurately determined, and the machine adjusted until the centres of the disks B and B' coincide with this centre, as shown in fig. 1, after which the machine is secured to the saw-blade by tightening the set-screws $c$ of the arms $a$ and $a'$. The forked ends of the arm H are then inserted into the recesses $k$ or $k'$ of the disks, and the latter are simultaneously turned to about the position shown in fig. 1.

The next stage of the operation is to adjust the cutter G, and bring it in contact with the saw-tooth, which is done by loosening the nuts $i$, and moving the blocks D through the guides $h$ of the disks, until the cutter bears against the front of the tooth, as shown in fig. 1; the nuts $i$ are then tightened to retain the cutter in this position. The crank-handle $j$ is now turned, and the cutter begins to operate on the tooth, and at the same time the disks are turned by means of the arm H, the cutter, as it is operated, being thus caused to follow the curve of the tooth, until it arrives to the position shown in fig. 2. The rod J is now moved forward until its notched end $l$ is in contact with the point of the tooth, and the plate $m$ is brought in contact with the blade of the saw, as shown in figs. 1 and 2, after which the set-screws $c$ are loosened, and the machine is removed to the next tooth to be cut. The position of the machine in respect to the second tooth is determined by the rod J and plate $m$, which bear against the tooth and saw, as above described, and after cutting this tooth, the machine is removed, and each tooth of the saw in succession is operated upon in the same manner, until the whole number have been cut. The extreme points of the teeth may then be sharpened by a file or otherwise.

It will be evident that this machine possesses a great advantage over saw-gummers of ordinary construction, in which the cutter must fit the semicircular front of the tooth, whereas in my machine, the cutter, as above described, is so adjusted and is so operated as to cut a saw-tooth of any size.

I claim as my invention, and desire to secure by Letters Patent—

1. The rotary cutter G, arranged to revolve in disks adapted to and admitting of being turned in a suitable frame secured to the saw, all substantially as described for the purpose specified.

2. The combination of the rotary cutter G, its bearing-blocks D D, adapted to the movable disks B, all substantially as and for the purpose herein set forth.

3. The rod J rendered adjustable on the machine, and having a notched end, adapted to the point of one of the teeth of the saw, as set forth for the purpose described.

4. The recesses $k$ $k'$ in the disks B, for the reception of the forked end of the lever H.

In testimony whereof, I have signed my name to this specification in the presence of two subscribing witnesses.

THOS. S. DISSTON.

Witnesses:
  JOHN WHITE,
  CHAS. B. PRICE.